June 22, 1954  F. W. STUBNER  2,682,003
ACCELEROMETER
Filed Nov. 28, 1950

INVENTOR
F. W. STUBNER
BY
ATTORNEY

Patented June 22, 1954

2,682,003

UNITED STATES PATENT OFFICE 2,682,003

ACCELEROMETER

Franz W. Stubner, Emmaus, Pa., assignor to Bell Telephone Laboratories, Incorporated, New York, N. Y., a corporation of New York Application November 28, 1950, Serial No. 197,995

1 Claim. (Cl. 310—8.4)

This invention relates to accelerometers and more particularly to accelerometers including an electromechanical transducer element.

In a number of fields and applications, equipment, such as electronic equipment may be subjected to high and varying accelerations. In order to design such equipment which will be satisfactory for use under anticipated operating conditions, it is desirable to have detailed knowledge as to the character, for example the magnitude and wave form, of the forces to which the equipment will be subjected during such use. Devices, particularly accelerometers, have been proposed heretofore for the purpose of obtaining such knowledge. However, known devices suffer from one or more of several distinct limitations, among which may be mentioned instability, low sensitivity and tendency to break under shock forces. Furthermore, in order that the knowledge obtained may be accurate it is desirable that the accelerometer be capable of substitution in an assembly for the device or element to be tested without seriously altering the mechanical or vibratory constants of the assembly. Known accelerometers do not entirely satisfy this desideratum.

One general object of this invention is to improve the structure and the performance characteristics of accelerometers and more particularly of such devices including a pressure sensitive electromechanical transducer element.

Another object of this invention is to enable the accurate determination of the magnitude and wave form of acceleration and shock forces to which a body is subjected under operating conditions.

In one illustrative embodiment of this invention, an accelerometer comprises a housing and a pressure sensitive electromechanical transducer element mounted within the housing for vibration concomitantly therewith. This element may be, for example and particularly advantageously, a disc of barium titanate having electrodes on two spaced portions thereof, the element being oriented within the housing so that variable acceleration of the housing in a given direction will result in variation in the voltage developed between the two electrodes. A mass member, which may serve as one of the electrodes, engages the transducer element and is held thereagainst by a spring. When the housing is accelerated, relative motion obtains between the housing and the mass member, whereby the element is strained in accordance with the acceleration of the housing. Thus, the potential developed between the electrodes is a measure of the acceleration.

In accordance with one feature of this invention, uniform stress distributing means, specifically, in one embodiment, a spherical member, is provided between the mass member and the spring. This means minimizes the probability of destruction of the pressure sensitive transducer element as a result of forces and, particularly, shock forces to which the housing may be subjected.

In accordance with a further feature of this invention, the elements constituting the vibratory system are so constructed and arranged that the vibratory constants specifically the total weight and weight distribution of the accelerometer closely approximate those of the element with respect to which measurements are to be made, whereby the accelerometer may be substituted in an assembly for such element without substantially altering the mechanical and vibratory characteristics of the assembly. Thus, the measurements of the accelerating or shock forces obtained are accurate for the device with respect to which the knowledge is desired.

The invention, together with the above-noted and other features thereof, will be understood more clearly and fully from the following detailed description with reference to the accompanying drawing, in which.

Figure 1:
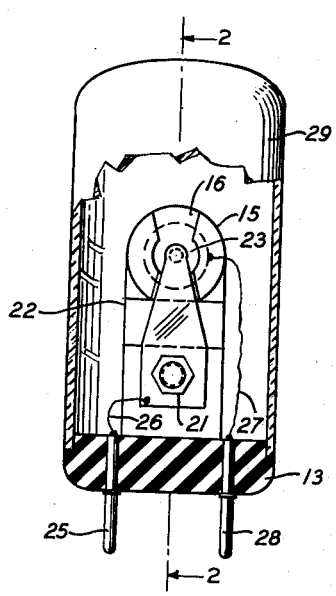
Fig. 1 is a front view partially in section of one illustrative embodiment of this invention.
Figure 2:
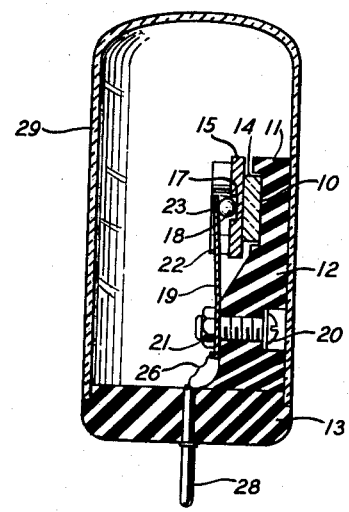
Fig. 2 is a sectional side view of the device of Fig. 1.

Referring now to the drawing, seated upon a foil electrode 10, which rests against a flat base of a recessed portion 11 of a flange 12 of a base or foundation member 13 of insulating material, is a pressure sensitive electromechanical transducer element 14. In a preferred form, the transducer element 14 is a cylindrical disc of a barium titanate ceramic of the type disclosed in the application Serial No. 82,120, filed March 18, 1949, of W. P. Mason. A mass 15, of a conducting material which has a relatively high density such as brass, for example, having a grooved portion 16 and a cylindrical recessed portion 17, which recessed portion 17 accommodates a spherical member 18, is seated against the transducer element 14. The spherical member advantageously is of metal.

The foil electrode 10, which advantageously is of a soft metal, transducer element 14, mass 15, and spherical member 18 are held in a pile-up arrangement by a pretensioned leaf spring 19. The spring 19 is fastened to the base or foundation member 13 by the screw 20 and the nut 21. The end portion 22 of the spring 19 extends into the grooved portion 16 of the mass 15 and has a cylindrical recess 23 therein which accommodates the spherical member 18.

Extending externally from the base or foundation member 13 are prongs which resemble the prongs of a miniature vacuum tube; thus, the accelerometer may be inserted into a vacuum tube socket. The foil electrode is connected to one of these prongs 28 by the lead 27 and the mass 15 acting as an electrode is electrically connected through the spherical member 18, the spring 19 and the lead 26 to another prong 25.

A cover member or housing 29, which is attached to the base 13 for example by cement, may be coated interiorly, e. g., by evaporating a metallic layer thereon, thus shielding the accelerometer against electrostatic fields. This shielding layer is electrically connected to the prong 25 which is at ground potential.

If the accelerometer housing is moved with rectilinear simple harmonic motion in a direction perpendicular to the faces of the electromechanical transducer element 14, neglecting damping, the displacement of the mass 15 relative to the base or foundation member 13 is given by $$y = \frac{X_0 \left(\frac{\omega}{\omega_n}\right)^2 \sin \omega t}{1 - \left(\frac{\omega}{\omega_n}\right)^2} \quad (1)$$

where $y$ = displacement of mass relative to base
$X_0$ = maximum displacement of housing from equilibrium position
$\omega$ = circular frequency of simple harmonic motion to be measured
$\omega_n$ = natural circular frequency of spring-mass system.

The force, F, exerted by the springs on the mass is:

$$F = (K_1 + K_2)y = \frac{(K_1 + K_2)X_0 \left(\frac{\omega}{\omega_n}\right)^2}{1 - \left(\frac{\omega}{\omega_n}\right)^2} \sin \omega t \quad (2)$$

where $K_1$ = spring constant of the leaf spring
$K_2$ = spring constant of the transducer member By constructing the accelerometer so that $\omega_n \gg \omega$ and $K_2 \gg K_1$, Equation 2 approximates $$F = \frac{K_2}{\omega_n^2}(X_0 \omega^2 \sin \omega t) = ma$$

where $$\frac{K_2}{\omega_n^2} = m, \text{ a constant}$$

and $$X_0 \omega^2 \sin \omega t = a$$

the acceleration to be measured.

It will be noted that while the leaf spring 19 should have a relatively small spring constant, the spring force must be sufficiently large that the net force on the transducer element is at all times compressive. This is accomplished by a large static deflection of the leaf spring 19 which is obtained by a relatively large initial deformation.

Figure 4:
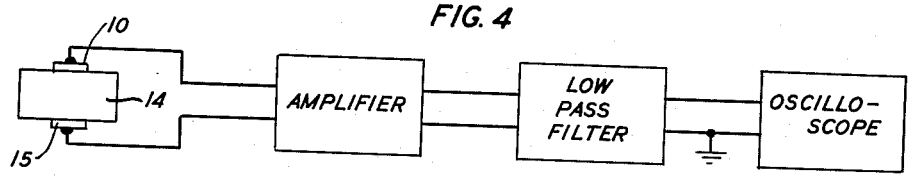
Fig. 4 is a schematic illustrating the association of the device of Fig. 1 and other apparatus to observe acceleration.

A voltage variation across the transducer element 14 will depend upon the force, F, on the transducer element, and hence upon the acceleration to be measured. This voltage variation is observed by inserting the accelerometer by means of connections to the prongs 25 and 28 into the circuit shown schematically in Fig. 4. The output of the transducer element is amplified by the amplifier, and any unwanted high frequency components such as the natural frequency of the accelerometer are filtered by a low pass filter. The voltage variation and hence the acceleration as a function of time is observed on the oscillograph.

Figure 3:
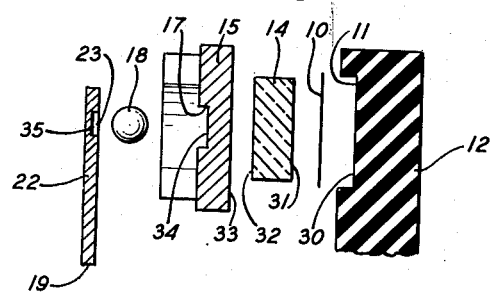
Fig. 3 is an exploded view showing the transducer element assemblage of the device of Figs. 1 and 2.

Referring now particularly to Fig. 3, it may be observed that the structure employed advantageously avoids stress concentration in the transducer element 14 which may be sufficiently high to cause failure. Any minute irregularities or dirt particles on the surface 30 of the recessed portion 11 or on the surface 31 of the transducer element 14 are embedded in the foil electrode 10. The surfaces 32 and 33 of the transducer element 14 and of the mass 15 are both lapped flat and precaution is taken to insure the freedom of these surfaces from dirt particles. The spherical member 18 rests against the flat surfaces 34 and 35 of the recessed portions 17 and 23 of the mass 15 and the spring 19. While the cylindrical surfaces of the recesses 23 and 17 facilitate the placing of the spherical member 18 and prevent its displacement in a plane parallel to the faces 31 and 32 of the transducer element 14, they exert but a negligible force on the member 18 during the operation of the accelerometer. The faces 31 and 32 of the element 14 and the faces 33 and 34 of the mass 15 are all parallel to each other. Thus, essentially only that component of the spring force which is normal to the surface 34 of the mass 15 is transmitted to the mass 15. The member 18 is so placed that this force is applied at the centroid of the area of the identical surfaces 31 and 32 of the element 14. The mass 15 is polar symmetrical with respect to an axis passing through the centroid of area of and perpendicular to the faces 31 and 32 of the element 14. Thus the stress distribution in the element 14 is uniform when the accelerometer is accelerated in a direction parallel to the axis defined hereinabove.

The use of the barium titanate ceramic of the type disclosed in the application heretofore identified permits a smaller structure than is possible with other known materials. This material has a high compressive strength and is quite stable, non-hygroscopic, and relatively insensitive to temperature changes at usual room temperatures. Its electrical response is approximately fifty times that of quartz for given stresses. Thus, it is possible to construct an accelerometer having principal physical constants similar to any small element of a mechanical system. The principal constants of one illustrative embodiment of this invention are given in the table below.

| | |
|---|---|
| Weight in grams | 9.2 |
| Center of gravity measured from base, in inches | 21/32 |
| Lowest resonant frequency, in cycles/second | Approx. 8000 |
| Usable frequency range to | Approx. 2000 |
| Sensitivity in coulombs/g | $.54 \times 10^{-12}$ |

Although a specific embodiment of this invention has been shown and described, it will be understood that it is but illustrative and that various modifications can be made therein without departing from the scope and spirit of the invention as defined by the appended claim.

What is claimed is:

An accelerometer for determining impacts encountered by an electron discharge device comprising a housing of a configuration conforming to that of said electron discharge device and including a base member having a number of terminal prongs extending therethrough for positioning the accelerometer in a socket in place of the electron discharge device, an insulating member secured to said base, positioned against the inner wall of said housing, and having a recess therein away from said inner wall, a thin foil electrode positioned in said recess, conducting means connecting said foil electrode to one of said prongs, a pressure sensitive transducer element having flat parallel sides seated in said recess, one side of said transducer element bearing against said foil electrode, a conducting mass member heavy in comparison to said transducer element, said member having a flat side bearing against the other side of said transducer element, a recess in the side away from said transducer element, and a groove in said side away from said transducer element, conducting means connecting said mass member to another of said prongs, a cantilever spring supported by said insulating member adjacent said base member and having its free end extending through said groove in said mass member, said free end having a recess therein opposite said recess in said mass member, and a spherical member seated in the recess in said cantilever spring and in the recess in said mass member and applying a stress to said transducer element due to said cantilever spring, the total weight of the above-mentioned elements of the accelerometer closely approximating that of said electron discharge device for which impact measurements are to be made.

References Cited in the file of this patent

UNITED STATES PATENTS

| Number | Name | Date |
| --- | --- | --- |
| 2,202,220 | Miller | May 28, 1940 |
| 2,250,496 | Postlethwaite | July 29, 1941 |
| 2,360,618 | Pash | Oct. 17, 1944 |
| 2,454,769 | Busnel | Nov. 30, 1948 |
| 2,487,035 | Weaver | Nov. 1, 1949 |
| 2,497,966 | Via | Feb. 21, 1950 |
| 2,507,374 | Franklin | May 9, 1950 |
| 2,514,297 | Smith | July 4, 1950 |

FOREIGN PATENTS

| Number | Country | Date |
| --- | --- | --- |
| 300,218 | Italy | Sept. 2, 1932 |
| 896,806 | France | Mar. 5, 1945 |